(12) United States Patent
Nazari

(10) Patent No.: US 6,842,789 B1
(45) Date of Patent: Jan. 11, 2005

(54) METHOD AND APPARATUS FOR ASSIGNING UNIQUE DEVICE IDENTIFIERS ACROSS A DISTRIBUTED COMPUTING SYSTEM

(75) Inventor: Siamak Nazari, Arcadia, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 709 days.

(21) Appl. No.: 09/686,109

(22) Filed: Oct. 10, 2000

Related U.S. Application Data

(60) Provisional application No. 60/160,993, filed on Oct. 21, 1999.

(51) Int. Cl.⁷ .............................................. G06F 15/16
(52) U.S. Cl. .......................................... 709/245; 710/9
(58) Field of Search ................................ 709/224, 245, 709/227, 228, 220, 222, 223, 321, 106; 710/9, 8, 19, 104, 3, 4

(56) References Cited

U.S. PATENT DOCUMENTS

| | | | | |
|---|---|---|---|---|
| 4,730,251 A | * | 3/1988 | Aakre et al. ................. | 710/104 |
| 5,317,693 A | * | 5/1994 | Cuenod et al. ................ | 710/9 |
| 5,692,193 A | * | 11/1997 | Jagannathan et al. ....... | 709/106 |
| 5,819,107 A | * | 10/1998 | Lichtman et al. .............. | 710/8 |
| 6,256,740 B1 | * | 7/2001 | Muller et al. ............... | 713/201 |
| 6,415,339 B1 | * | 7/2002 | Farmwald et al. ............ | 710/23 |
| 6,457,069 B1 | * | 9/2002 | Stanley .......................... | 710/8 |
| 6,496,839 B2 | * | 12/2002 | Cabrera et al. ............. | 707/203 |
| 6,578,069 B1 | * | 6/2003 | Hopmann et al. .......... | 709/203 |
| 6,625,145 B1 | * | 9/2003 | Winell ........................ | 370/389 |

FOREIGN PATENT DOCUMENTS

| | | |
|---|---|---|
| EP | 0 889 400 A1 | 1/1999 |
| WO | WO 95/32463 | 11/1995 |

OTHER PUBLICATIONS

Taylor, Dave, "Teach Yourself UNIX In A Week", Copyright 1994 by Sams Publishing, P.175.*

* cited by examiner

*Primary Examiner*—Marc D. Thompson
(74) *Attorney, Agent, or Firm*—Park, Vaughan & Fleming LLP

(57) ABSTRACT

One embodiment of the present invention provides a system that facilitates assigning an identifier to a device within a distributed computing system, wherein the identifier is unique across the distributed computing system. The system operates by detecting the presence of the device within a local computer system within the distributed computing system. If an identifier has not been assigned to the device, the system assigns an identifier to the device by, attempting to retrieve the identifier from a local pool of device identifiers within the local computer system. If the local pool is empty, the system retrieves at least one additional identifier for the local pool from a global allocator for device identifiers located within the distributed computing system. Next, the system assigns the retrieved identifier to the device so that the identifier can be used to reference the device.

12 Claims, 4 Drawing Sheets

METHOD AND APPARATUS FOR ASSIGNING UNIQUE DEVICE IDENTIFIERS ACROSS A DISTRIBUTED COMPUTING SYSTEM

RELATED APPLICATION

The application hereby claims priority under 35 U.S.C. § 119 to Provisional Patent Application No. 60/160,993 filed on Oct. 21, 1999.

BACKGROUND

1. Field of the Invention

The present invention relates to operating systems for computers. More specifically, the present invention relates to a method and an apparatus for assigning device identifiers that are unique across a distributed computing system.

2. Related Art

Operating systems for computers often facilitate accessing devices, such as disk drives and printers, through a pathname as well as an integer device identifier. For example, a disk drive may be referenced through a pathname, such as "/dev/rdsk/c0t0d0s0," as well as through an integer device identifier, such as "5064." This integer device identifier can be used by programmers and system administrators to access the device, and can also be used by device drivers to control the device. Note that if two device identifiers have the same value they are assumed to refer to the same device.

The use of device identifiers becomes complicated in a distributed computing system including multiple computing nodes coupled together by a network. Such a distributed computing system is typically controlled by a distributed operating system, which enables the multiple computing nodes to communicate with each other, and enables the computing nodes to share resources, such as devices.

Producing a unique pathname for a device in a distributed computing system is typically accomplished by inserting a name for the computing node into the pathname for the device. For example, the pathname "dev/node 1/rdsk/c0t0d0s0" refers to a device located on node 1.

However, assigning unique device numbers cannot be accomplished in the same way, because existing distributed operating systems provide no mechanism for combining node identifiers into device identifiers. Hence, local computing nodes typically assign their own local device identifiers. Consequently, the same identifier can potentially be assigned to different devices by different local nodes in the distributed computing system. It is possible to solve this problem by providing a mechanism to translate between local and global device identifiers. However, the process of maintaining such a system is cumbersome and inefficient.

What is needed is a method and an apparatus for assigning device identifiers that are unique across a distributed computing system.

SUMMARY

One embodiment of the present invention provides a system that facilitates assigning an identifier to a device within a distributed computing system, wherein the identifier is unique across the distributed computing system. The system operates by detecting the presence of the device within a local computer system within the distributed computing system. If an identifier has not been assigned to the device, the system assigns an identifier to the device by attempting to retrieve the identifier from a local pool of device identifiers within the local computer system. If the local pool is empty, the system retrieves at least one additional identifier for the local pool from a global allocator for device identifiers located within the distributed computing system. Next, the system assigns the retrieved identifier to the device so that the identifier can be used to reference the device.

In one embodiment of the present invention, the identifier includes a device major number that specifies a device driver to be used to access the device, and a device minor number that identifies the device to be accessed by the device driver. This device minor number includes an instance number that uniquely identifies an instance of the device, and a unit number that identifies an independently addressable sub-unit within the device. In a variation on this embodiment, in attempting to retrieve the identifier from the local pool, the system attempts to retrieve the instance number from the local pool. The system combines this instance number with the device major number and the unit number to produce the identifier.

In one embodiment of the present invention, if the global allocator is inaccessible, the system assigns a provisional identifier from the local computer system. In a variation on this embodiment, when the global allocator later becomes accessible, the system communicates the provisional identifier to the global allocator. If the global allocator approves the provisional identifier, the system records the provisional identifier as a permanent device identifier. If the global allocator rejects the provisional identifier, the system assigns a new identifier to the device from the global allocator.

In one embodiment of the present invention, retrieving at least one additional identifier from the global allocator involves retrieving a block of identifiers from the global allocator.

In one embodiment of the present invention, the device can include a disk drive, a tape drive, an I/O device or a networking device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
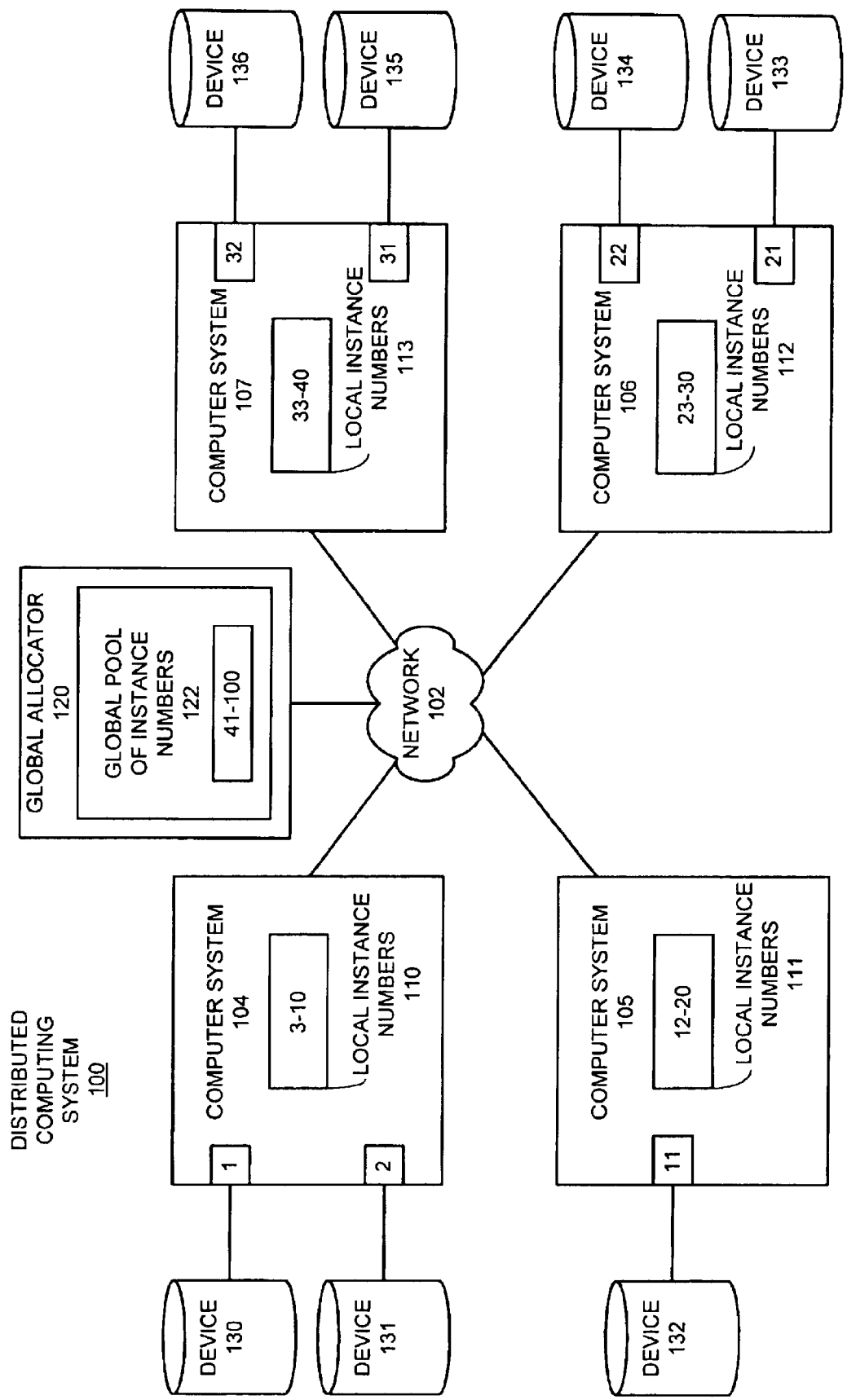
FIG. 1 illustrates a distributed computing system in accordance with an embodiment of the present invention.

FIG. 1 illustrates a distributed computing system 100 in accordance with an embodiment of the present invention. Distributed computing system 100 is comprised of a number of local computer systems 104–107, which are coupled together through a network 102. Computer systems 104–107 can generally include any type of computer system, including, but not limited to, computer systems based on a microprocessor, a mainframe computer, a digital signal processor, a portable computing device, a personal organizer, a device controller, and a computational engine within an appliance. Network 102 can generally include any type of wire or wireless communication channel capable of coupling together computing nodes. This includes, but is not limited to, a local area network, a wide area network, or a combination of networks.

Distributed computing system 100 additionally includes global allocator 120, which is a server that assigns device instance numbers (identifiers) to local computer systems 104–107 from a global pool of instance numbers 122. Global allocator 120 can generally include any mechanism for servicing requests from a client for computational and/or data storage resources. Note that global allocator 120 can reside on one of local computer systems 104–107 or, alternatively, can reside on a dedicated computing node that is independent of local computer systems 104–107.

Computer systems 104–107 are coupled to a number of local devices 130–136. More specifically, computer system 104 is coupled to devices 130–131; computer system 105 is coupled to device 132; computer system 106 is coupled to devices 133–134; and computer system 106 is coupled to devices 135–136. Devices 130–136 can generally include any type of physical device that is coupled to a computer system and is controlled by a device driver. For example, devices 130–136 can include data storage devices, such as disk drives and magnetic tape. Devices 130–136 can additionally include I/O devices, such as a display or a keyboard. Devices 130–136 can also include networking devices, such as a network interface controller (NIC). Devices 130–136 can also include computational devices, such as a graphics accelerator.

During operation, device instance numbers (identifiers) are assigned to local computer systems 104–107 from global allocator 120. Local computer systems 104–107 then allocates these device identifiers to devices 130–136, so that devices 130–136 can be accessed through these identifiers.

For example, referring the FIG. 1, global pool of instance numbers 122 initially starts out with instance numbers 1–100. Some of these instance numbers 1–100 are then allocated to local computer systems 104–107 so that: local computer system 104 gets instance numbers 1–10; local computer system 105 gets instance numbers 11–20; local computer system 106 gets instance numbers 21–30; and local computer system 107 gets instance numbers 31–40. At this point, global pool instance numbers 122 contains instance numbers 41–100.

Some of these allocated global instance numbers are then assigned to devices, so that: instance numbers 1 and 2 are assigned to devices 130 and 131; instance number 11 is assigned to device 132; instance numbers 21 and 22 are assigned to devices 133 and 134; and instance numbers 31 and 32 are assigned to devices 135 and 136.

At this point, local computer system 104 has instance number 3–10 available to be allocated; local computer system 105 has instance number 12–20 available to be allocated; local computer system 106 has instance number 23–30 available to be allocated; and local computer system 107 has instance number 33–40 available to be allocated.

Device Identifier

Figure 2:
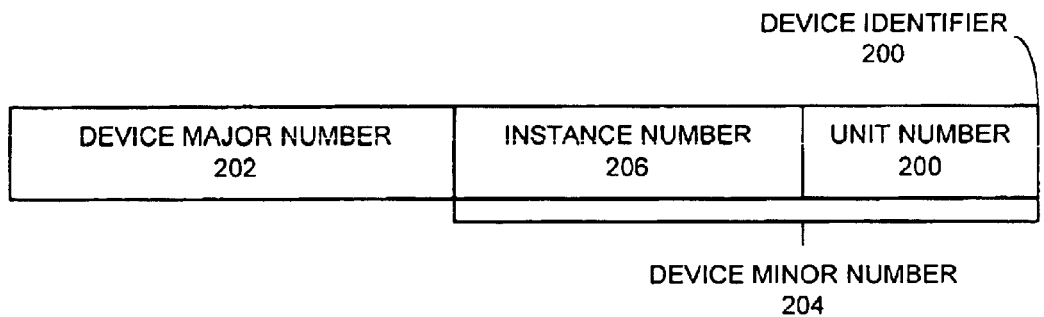
FIG. 2 illustrates the structure of a device identifier in accordance with an embodiment of the present invention.

FIG. 2 illustrates the structure of a device identifier 200 in accordance with an embodiment of the present invention. Device identifier 200 is comprised of a device major number 202 and a device minor number 204. In one embodiment of the present invention, device major number 202 is 14 bits in length and device minor number 204 is 18 bits in length. Device major number 202 specifies the type of device that is being referenced, and thereby specifies the device driver that is used to control the device.

Device minor number 202 identifies a specific device that is to be controlled by the device driver. Device minor number 202 is further divided into an instance number 206 and a unit number 208. Instance number 206 specifies a specific instance of a device, and unit number 208 specifies an independently addressable sub-unit of the specific instance. For example, a disk drive may be comprised of multiple slices, each one of which is referenced through a different unit number. In another example, a tape drive may include multiple unit numbers for different access modes, such as read-only or read-write.

Note that the terms "device identifier" and "device instance number" are used interchangeably throughout this specification because the device instance number uniquely identifies the device across the distributed computing system.

Device Table

Figure 3:
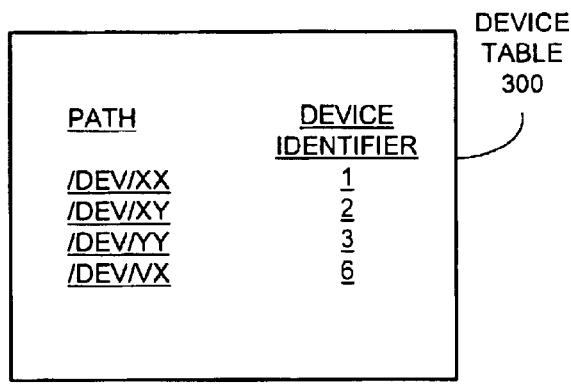
FIG. 3 illustrates the structure of a device table in accordance with an embodiment of the present invention.

FIG. 3 illustrates the structure of a device table 300 in accordance with an embodiment of the present invention. Device table 300 contains a pathname and a device identifier for each device that is presently configured within a local computer system. Note that each local computer system 104–107 includes its own device table 300. In some distributed computing systems, there exists a system-wide device table containing pathnames and identifiers for all devices in the distributed computing system.

Use of Device Identifier

Figure 4:
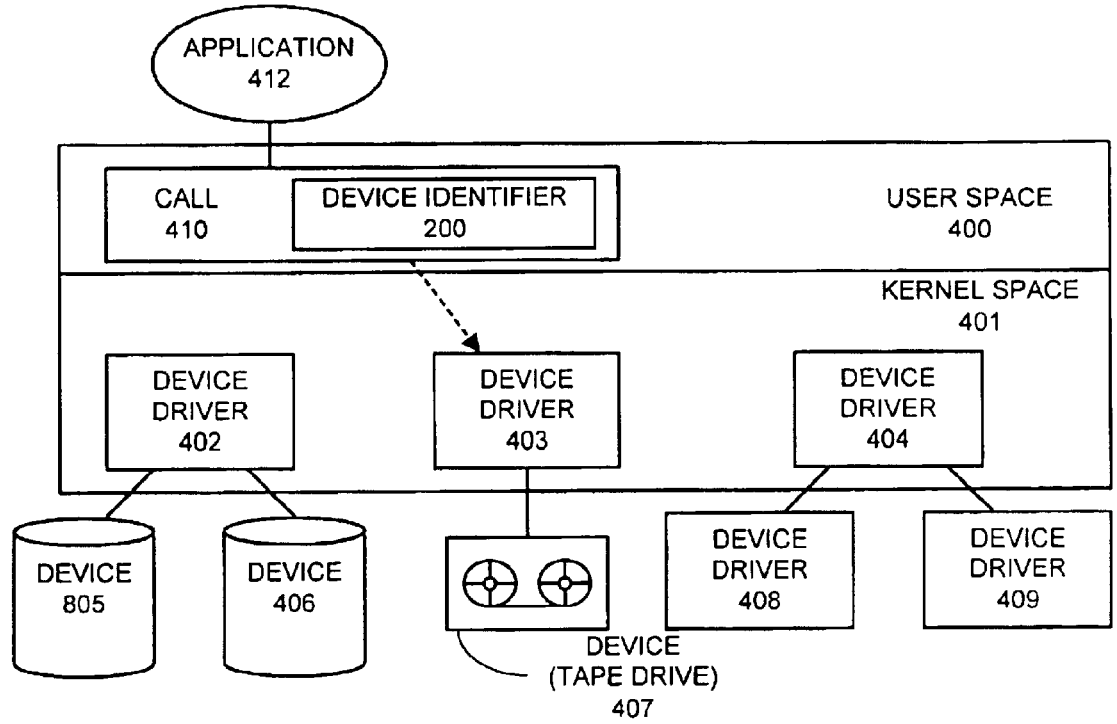
FIG. 4 illustrates the use of a device identifier in accordance with an embodiment of the present invention.

FIG. 4 illustrates the use of a device identifier 200 in accordance with an embodiment of the present invention. An application 412 that is operating out of user space 400 within a local computer system makes a system call 410 that includes device identifier 200. This system call 410 is routed to a device driver 403 within kernel space 401 based upon the device major number 202 of device identifier 200.

Note that kernel space 401 includes a number of device drivers 402–404, which can be used to communicate with a number of devices 405–409. More specifically, device driver 402 communicates with devices 405–406, device driver 403 communicates with device 407, and device driver 404 communicates with devices 408–409.

Process of Assigning Device Identifier

Figure 5:
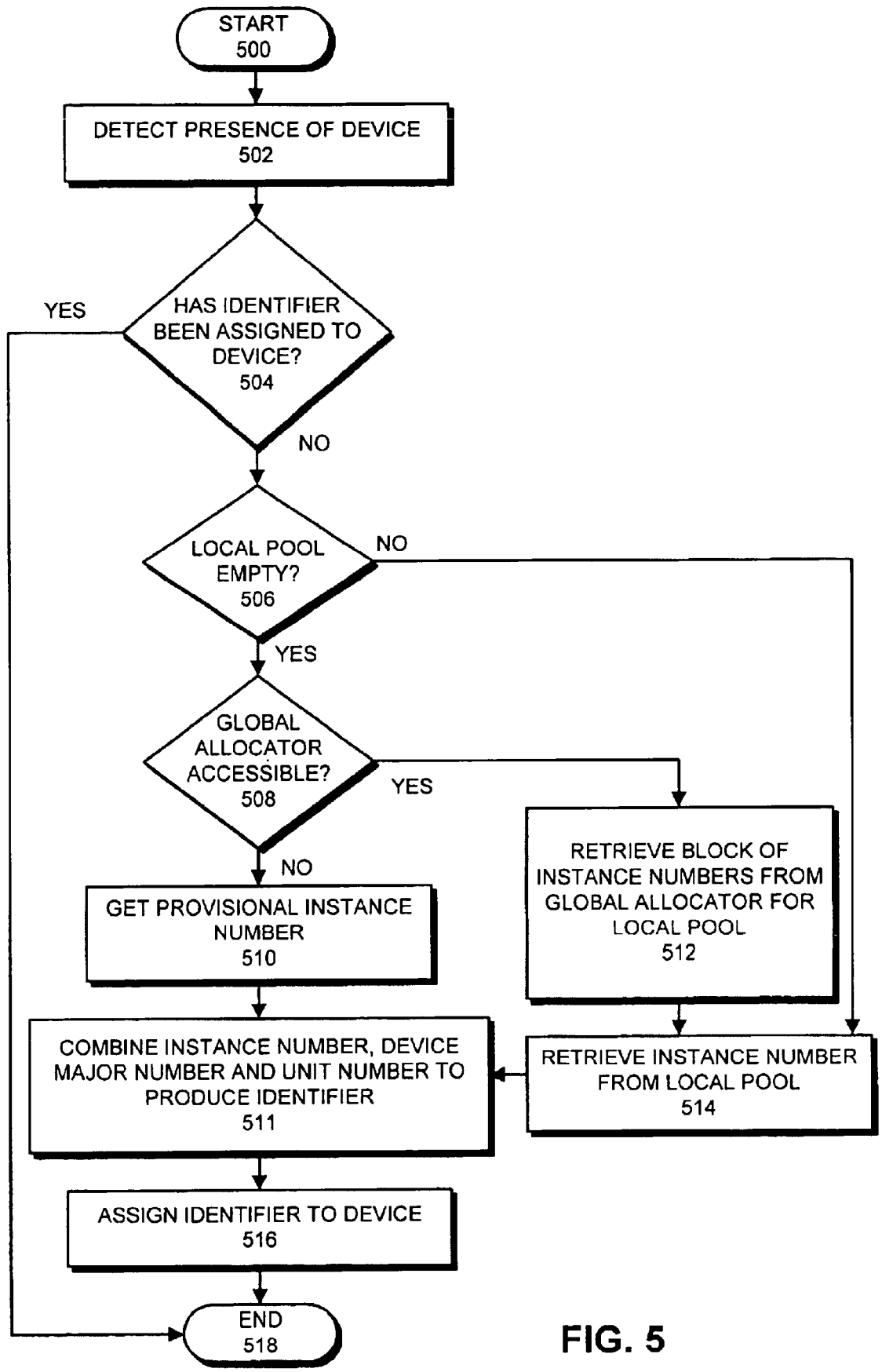
FIG. 5 is a flow chart illustrating the process of assigning a device identifier in accordance with an embodiment of the present invention.

FIG. 5 is a flow chart illustrating the process of assigning a device identifier in accordance with an embodiment of the present invention. The assignment process typically starts when a device comes on line within a in computer system. The system first detects the presence of the device (step 502). Next, the system determines if an identifier has already been assigned to the device (step 504). If so, the process is complete.

Otherwise, the system examines a local pool of instance numbers (identifiers) to determine whether the local pool is empty (step 506).

If the local pool is empty, the system determines if global allocator 120 for identifiers is accessible (step 508). Note that global allocator 120 is often temporarily inaccessible because the assignment process often takes place during system initialization. Hence, global allocator 120 may not yet be initialized, or reachable from the local computer system, when the assignment process takes place.

If global allocator 120 is not accessible, the system gets a provisional instance number from the local computer system (step 510). This provisional instance number can either be generated on-the-fly or, alternatively, can be retrieved from a data structure within the local computer system.

If global allocator 120 is accessible, the system retrieves a block of instance numbers from global allocator 120 for the local pool of identifiers on the local computer system (step 512).

Next, if the local pool is not empty in step 506, or if a new block of identifiers has been retrieved in step 512, the system retrieves a device instance number (identifier) from the local pool (step 514).

Next, using either the provisional instance number from step 510 or the newly retrieved instance number from step 514, the system produces an identifier for the device by combining the instance number with a device major number and a unit number as is described in more detail above with reference to FIG. 2.

Finally, this identifier is assigned to the device (step 516). However, note that an identifier constructed from a provisional instance number may later change if the provisional instance number is later determined to be invalid.

Figure 6:
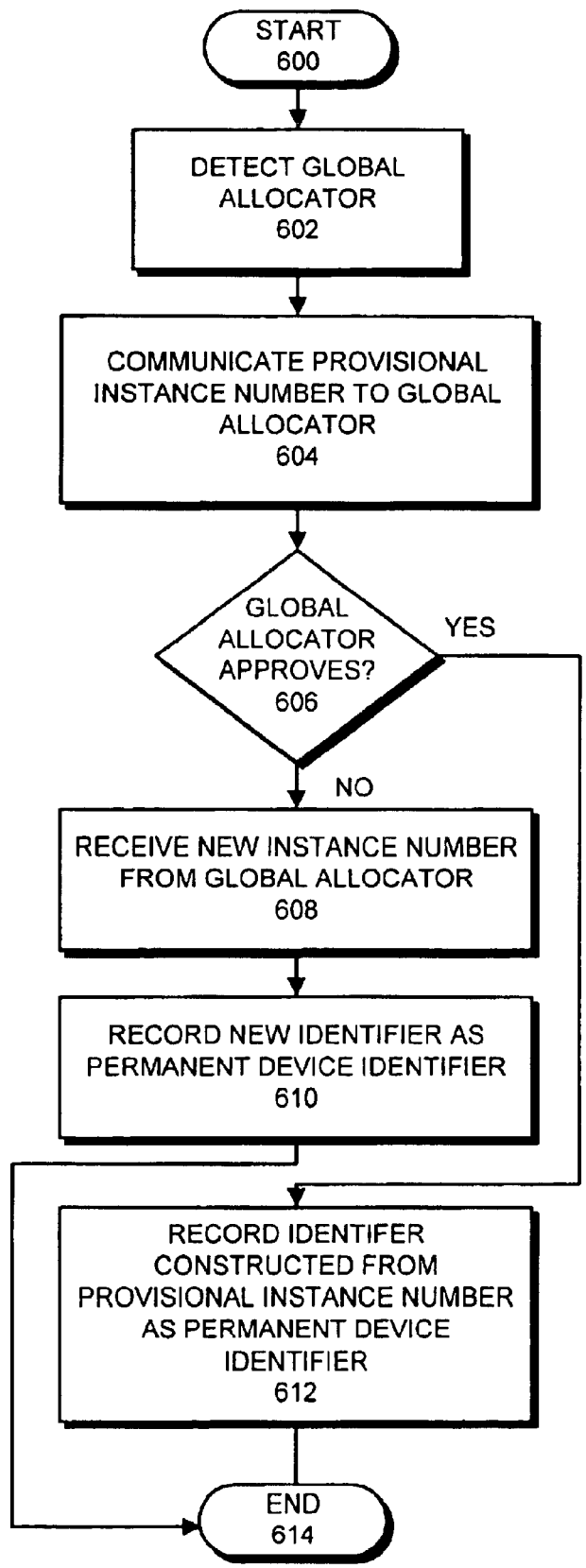
FIG. 6 is a flow chart illustrating the process of handling a provisional instance number when the global allocator later becomes available in accordance with an embodiment of the present invention.

FIG. 6 is a flow chart illustrating the process of handling a provisional instance number when global allocator 120 later becomes available in accordance with an embodiment of the present invention.

The system starts by detecting the presence of global allocator 120 (step 602). This can be accomplished through a monitoring process that periodically attempts to communicate with global allocator 120.

Next, the system communicates the provisional instance number to global allocator 120 (step 604).

Upon receiving the provisional instance number, global allocator 120 compares it with available instance numbers in the global pool of instance numbers 122. If the provisional instance number is one of the available instance numbers, global allocator 120 removes the provisional instance number from the global pool of instance numbers 122, and sends an approval to the local computer system. Otherwise, global allocator 120 sends a disapproval to the local computer system along with an additional block of instance numbers.

Next, the local computer system determines whether global allocator 120 approves of the provisional instance number (step 606). If not, the system receives a new block if instance numbers from global allocator 120 and retrieves an instance number from the new block of instance numbers (step 608). The system then constructs a device identifier from the newly retrieved instance number, and then records the device identifier as a permanent identifier for the device (step 610).

If global allocator 120 approves of the instance number, the system records the identifier constructed from the provisional instance number as the permanent device identifier (step 612). At this point, the identifier assignment process is complete. The device can subsequently be accessed through the device number, and no local-to-global translation for device identifiers is required.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for assigning an identifier to a device within a distributed computing system, wherein the identifier is unique across the distributed computing system, comprising:

detecting the presence of the device within a local computer system that is part of the distributed computing system; and if an identifier has not been assigned to the device, assigning an identifier to the device by, attempting to retrieve the identifier from a local pool of device identifiers within the local computer system, if the local pool is empty, retrieving at least one additional identifier for the local pool from a global allocator for device identifiers located within the distributed computing system, wherein retrieving at least one additional identifier from the global allocator involves retrieving a block of identifiers for the local pool from the global allocator, wherein if the global allocator is inaccessible, retrieving at least one additional identifier from the global allocator involves assigning a provisional identifier from the local computer system and wherein if the global allocator later becomes accessible the method further comprises:

communicating the provisional identifier to the global allocator, if the global allocator approves the provisional identifier, recording the provisional identifier as a permanent device identifier, and if the global allocator rejects the provisional identifier, assigning a new identifier from the global allocator to the device, and assigning the retrieved identifier to the device so that the identifier can be used to reference the device.

2. The method of claim 1, wherein the identifier includes a device major number that specifies a device driver to be used to access the device, and a device minor number that identifies the device to be accessed by the device driver, wherein the device minor number includes an instance number that uniquely identifies an instance of the device, and a unit number that identifies an independently addressable sub-unit within the device.

3. The method of claim 2, wherein attempting to retrieve the identifier from the local pool includes attempting to retrieve the instance number from the local pool, wherein the instance number is combined with the device major number and the unit number to produce the identifier.

4. The method of claim 1, wherein the device can include:
   a disk drive;
   a tape drive;
   an I/O device; and
   a networking device.

5. A computer-readable storage medium storing instructions that when executed by a computer cause the computer to perform a method for assigning an identifier to a device within a distributed computing system, wherein the identifier is unique across the distributed computing system, the method comprising:
   detecting the presence of the device within a local computer system that is part of the distributed computing system; and
   if an identifier has not been assigned to the device, assigning an identifier to the device by,
      attempting to retrieve the identifier from a local pool of device identifiers within the local computer system,
      if the local pool is empty, retrieving at least one additional identifier for the local pool from a global allocator for device identifiers located within the distributed computing system, wherein retrieving at least one additional identifier from the global allocator involves retrieving a block of identifiers for the local pool from the global allocator,
      wherein if the global allocator is inaccessible, retrieving at least one additional identifier from the global allocator involves assigning a provisional identifier from the local computer system, and wherein if the global allocator later becomes accessible, the method further comprises:
         communicating the provisional identifier to the global allocator,
         if the global allocator approves the provisional identifier, recording the provisional identifier as a permanent device identifier, and
         if the global allocator rejects the provisional identifier, assigning a new identifier from the global allocator to the device, and
      assigning the retrieved identifier to the device so that the identifier can be used to reference the device.

6. The computer-readable storage medium of claim 5, wherein the identifier includes a device major number that specifies a device driver to be used to access the device, and a device minor number that identifies the device to be accessed by the device driver, wherein the device minor number includes an instance number that uniquely identifies an instance of the device, and a unit number that identifies an independently addressable subunit within the device.

7. The computer-readable storage medium of claim 6, wherein attempting to retrieve the identifier from the local pool includes attempting to retrieve the instance number from the local pool, wherein the instance number is combined with the device major number and the unit number to produce the identifier.

8. The computer-readable storage medium of claim 5, wherein the device can include:
   a disk drive;
   a tape drive;
   an I/O device; and
   a networking device.

9. An apparatus that facilitates assigning an identifier to a device within a distributed computing system, wherein the identifier is unique across the distributed computing system, comprising:
   a detection mechanism that is configured to detect the presence of the device within a local computer system that is part of the distributed computing system; and
   an assignment mechanism, wherein if an identifier has not been assigned to the device, the assignment mechanism is configured to:
      attempt to retrieve the identifier from a local pool of device identifiers within the local computer system,
      if the local pool is empty, to retrieve at least one additional identifier for the local pool from a global allocator for device identifiers located within the distributed computing system, wherein in retrieving at least one additional identifier from the global allocator, the assignment mechanism is configured to retrieve a block of identifiers for the local pool from the global allocator,
      wherein if the global allocator is inaccessible, retrieving at least one additional identifier from the global allocator involves assigning a provisional identifier from the local computer system, and wherein if the global allocator later becomes accessible, the method further comprises:
         communicating the provisional identifier to the global allocator,
         if the global allocator approves the provisional identifier, recording the provisional identifier as a permanent device identifier, and
         if the global allocator rejects the provisional identifier, assigning a new identifier from the global allocator to the device, and to
      assign the retrieved identifier to the device so that the identifier can be used to reference the device.

10. The apparatus of claim 9, wherein the identifier includes a device major number that specifies a device driver to be used to access the device, and a device minor number that identifies the device to be accessed by the device driver, wherein the device minor number includes an instance number that uniquely identifies an instance of the device, and a unit number that identifies an independently addressable sub-unit within the device.

11. The apparatus of claim 10, wherein the assignment mechanism is configured to attempt to retrieve the instance number from the local pool, wherein the instance number is combined with the device major number and the unit number to produce the identifier.

12. The apparatus of claim 9, wherein the device can include:
   a disk drive;
   a tape drive;
   an I/O device; and
   a networking device.

* * * * *